United States Patent
Hadley et al.

(10) Patent No.: US 8,949,751 B2
(45) Date of Patent: Feb. 3, 2015

(54) METHODS AND SYSTEMS FOR WIRING SYSTEMS ANALYSIS AND VERIFICATION

(75) Inventors: Brent Hadley, Kent, WA (US); Patrick Jan Eames, Newcastle, WA (US); Michael Patrick Sciarra, Seattle, WA (US); Charles Mark Williams, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 680 days.

(21) Appl. No.: 12/331,216

(22) Filed: Dec. 9, 2008

(65) Prior Publication Data

US 2010/0146466 A1    Jun. 10, 2010

(51) Int. Cl.
G06F 17/50    (2006.01)

(52) U.S. Cl.
CPC ........ G06F 17/5095 (2013.01); *G06F 2217/36* (2013.01)

USPC .......... 716/100; 716/101; 716/102; 716/103; 716/126; 703/1; 703/4; 703/13; 703/14

(58) Field of Classification Search
USPC ............... 716/100–103, 126; 703/1, 4, 13–14
See application file for complete search history.

(56) References Cited

U.S. PATENT DOCUMENTS

| | | | |
|---|---|---|---|
| 6,272,387 B1 * | 8/2001 | Yoon | 700/83 |
| 7,082,590 B2 * | 7/2006 | Kragh et al. | 716/129 |
| 7,725,746 B2 * | 5/2010 | Lee et al. | 713/320 |
| 7,793,250 B2 * | 9/2010 | Saini et al. | 716/129 |
| 2003/0023947 A1 * | 1/2003 | Sakakura et al. | 716/17 |
| 2005/0183052 A1 * | 8/2005 | Ash-Rafzadeh | 716/8 |

* cited by examiner

*Primary Examiner* — Nghia Doan

(57) ABSTRACT

A method for visually verifying an implementation of a design is described. The method includes integrating logical design data, physical design data, and physical implementation data into a common data format and graphically displaying the commonly formatted data to provide a visualization of the design, the visualization including a spatial context component associated with the physical implementation data.

20 Claims, 11 Drawing Sheets

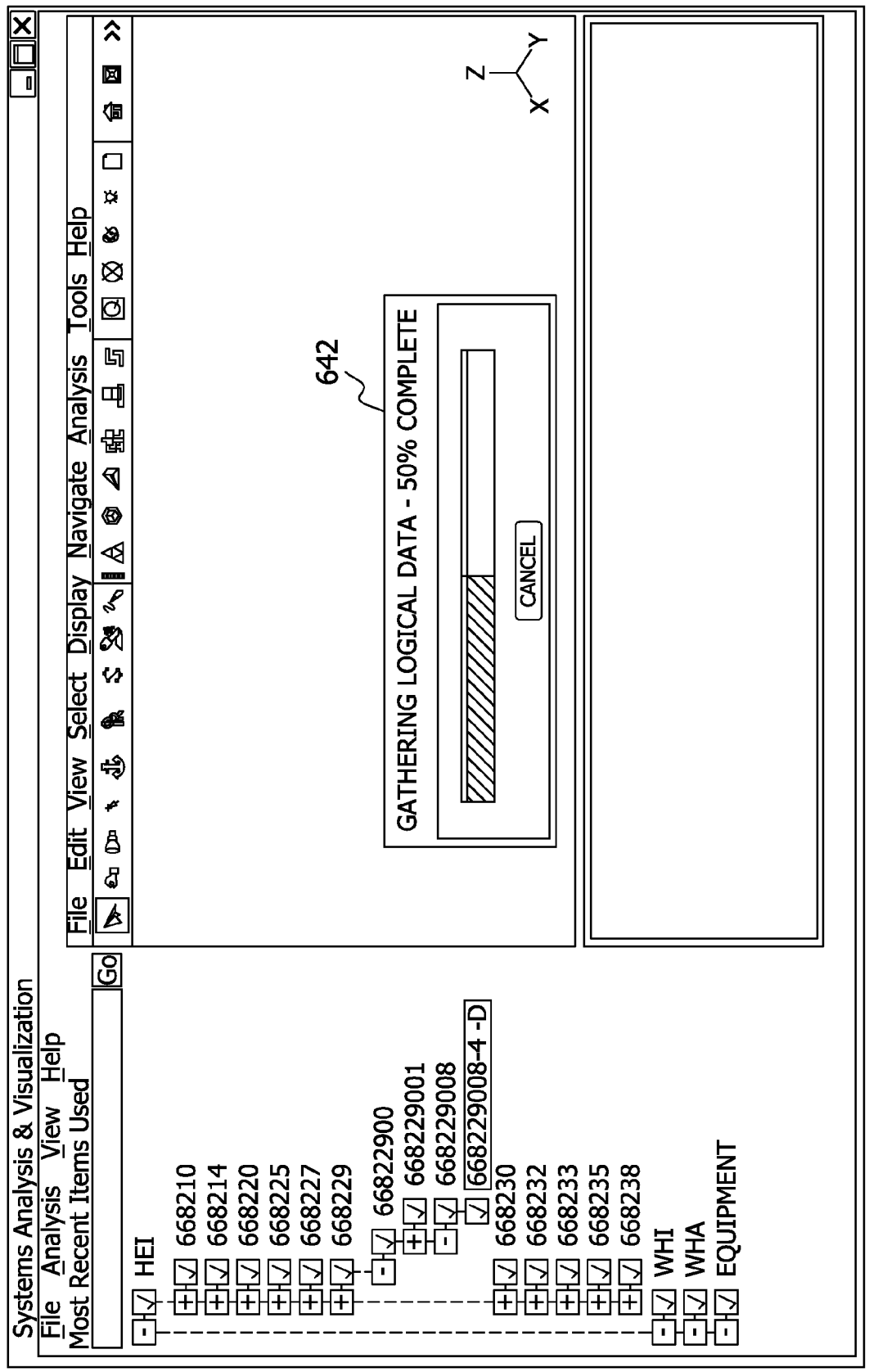

METHODS AND SYSTEMS FOR WIRING SYSTEMS ANALYSIS AND VERIFICATION

BACKGROUND OF THE INVENTION

The field of the invention relates generally to the manufacturing of systems with complex wiring systems, and more specifically, to methods and systems for wiring systems analysis and verification.

Certain traditional manufacturing enterprises are moving their business model to that of a large-scale systems integrator. As such, there is a need for systems and methods that verify wiring system designs developed by suppliers. As an example, aircraft wiring systems present unique challenges in terms of scale, spatial requirements, and the number of interfaces. For a typical aircraft, the wiring system design definition is scattered across multiple product data managers (PDMs).

One problem with such an arrangement is that system designers need to be able to visualize both three-dimensional geometric data and any related non-geometric data in order to verify and validate wiring systems configurations.

Currently, this problem is addressed using physical mockups (which is sometimes referred to as an iron horse), prototype construction, and paper engineering requirements and/or drawings. These solutions are labor intensive and consume many man hours that could be better applied elsewhere.

BRIEF DESCRIPTION OF THE INVENTION

In one aspect, a method for visually verifying an implementation of a design is provided. The method includes integrating logical design data, physical design data, and physical implementation data into a common data format, and graphically displaying the commonly formatted data to provide a visualization of the design, the visualization including a spatial context component associated with the physical implementation data.

In another aspect, a computer is provided that is programmed to receive physical implementation data, physical design data, and logical design data associated with a product design from a plurality of sources, perform a spatial analysis on the physical implementation data, physical design data, and logical design data, and generate a visualization of the spatial analysis for display on a user interface.

In still another aspect, a system is provided that is configured for visualization of design implementations. The system includes a computer comprising a user interface, and a logical data storage area communicatively coupled to the computer. The computer is configured to display, at the user interface, a listing of the logical designs stored within the logical data storage area, collect, from the logical storage area, physical implementation data, physical design data, and logical design data associated with a logical design selected by a user via the user interface, display, at the user interface, the physical implementation data and physical design data associated with the selected logical design, and display, at the user interface, the logical design data associated with the selected logical design along with any logical design data associated with the physical implementation data.

BRIEF DESCRIPTION OF THE DRAWINGS

FIG. 6C is a computer screen 640 including a sub-window indicating that logical data for a selected HEI is being gathered.

DETAILED DESCRIPTION OF THE INVENTION

Figure 1:
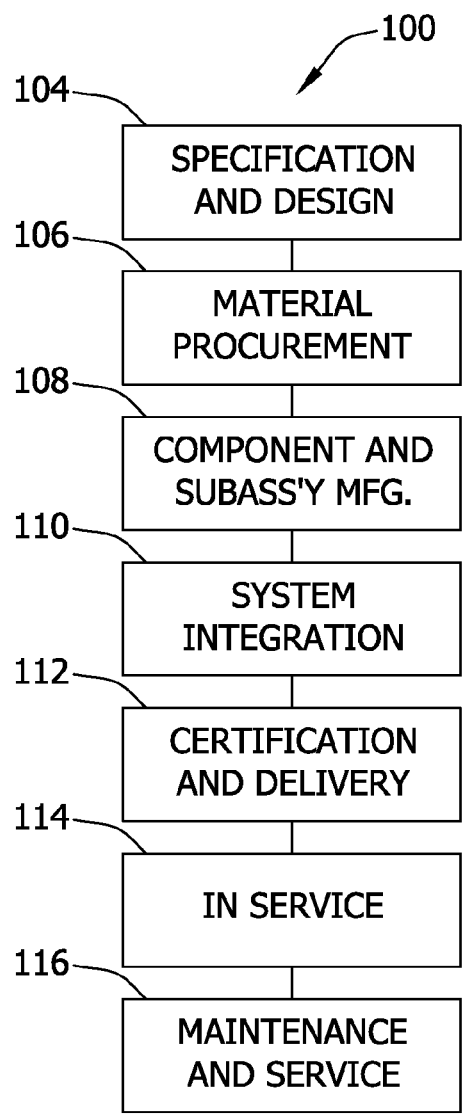
FIG. 1 is a flow diagram of aircraft production and service methodology.

The embodiments described herein, which are sometimes referred to as a systems analysis and visualization (SAV) tool, provides a method of integrating three-dimensional geometric physical design information together with its related non-geometric logical design information to verify and validate wiring systems design. One example application is the verification and validation of an aircraft wiring system design. It is a challenge to understand the different representations of a systems design starting from the various requirements through their physical implementation. As described further herein, it is possible to compare attribute data of the various designs (i.e., logical design data, physical design data, and physical implementation data), but a better representation of these designs is provided by graphically representing some of the first views of the logical design relative to how they are implemented in a physical design.

The life cycle of a design starts with functional requirements, progresses to logical design requirements, and eventually results in a physical design. One way to envision these requirements is to consider the logical design as a schematic and the physical design as a three dimensional implementation of the schematic and may include data associated with a wire system function, layout, location and implementation. It is important for entities developing designs of such complexity to verify that the logical design and the physical design are in sync. However, such verification is difficult if the various design data are in separate places. The SAV tool brings the data for the various designs together and allows a user to verify that, for example, the two designs mentioned above, are in sync.

The following is one example. In a logical design, the individual wires are inside a wire harness. The SAV tool is operable to trace each individual wire to make sure that the wire harness routing is complete. The SAV tool then verifies the contents of the physical design, that is, verifies physical placement of the individual wires of the wiring harness to ensure that any physical separation requirements between individual wires are met as well as to verify that the physical confines of the area the wires are to be placed provide the "real estate" needed to place that portion of the wiring harness. With reference to physical separation requirements, certain signals may need to be redundant, and therefore routed on both the left and right side of an airplane.

The SAV tool provides an ability to compare designs that are managed in different tools from different vendors. Each one of these vendor utilized tools may have a different data model. The data may be stored differently in each of the tools. The data representations may be authored in unique tools. The SAV tool brings those different data representations that were authored uniquely, often in a proprietary system, together to show what those relationships are. In summary the SAV tool integrates multiple, and sometimes unique, data models together to provide an integrated view of a design.

More specifically, the systems and methods embodied in the SAV utilize an application that integrates systems logical design data, two-dimensional schematic, and three-dimensional geometric data to allow visualization of the related data in a spatial context. The embodiments enhance systems and wire integration logical data with three-dimensional physical design information. Systems and wire integration logical data are graphically displayed in a single software tool. In at least one embodiment, common data in the wiring system's logical data and physical data are combined to allow a user to visualize systems signal routing, wire segment routing, and highlighting a wire harness assembly within one or many wire harness installations. Many other applications are contemplated even though the following descriptions utilize aircraft wiring systems as the illustrative example. As such the descriptions should be considered as examples only, and not limiting in any respect.

Figure 2:
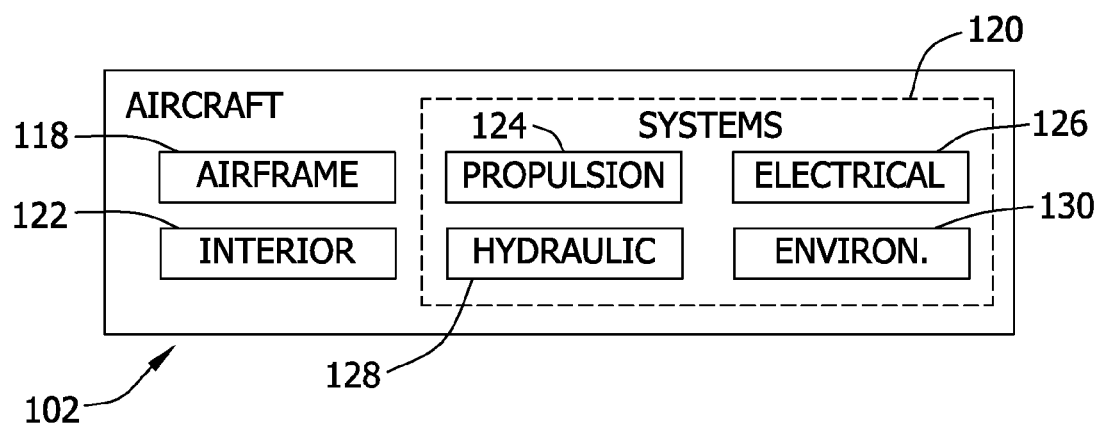
FIG. 2 is a block diagram of an aircraft.

Now referring more particularly to the drawings, embodiments of the disclosure may be described in the context of aircraft manufacturing and service method 100 as shown in FIG. 1 and an aircraft 200 as shown in FIG. 2. During preproduction, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and an interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
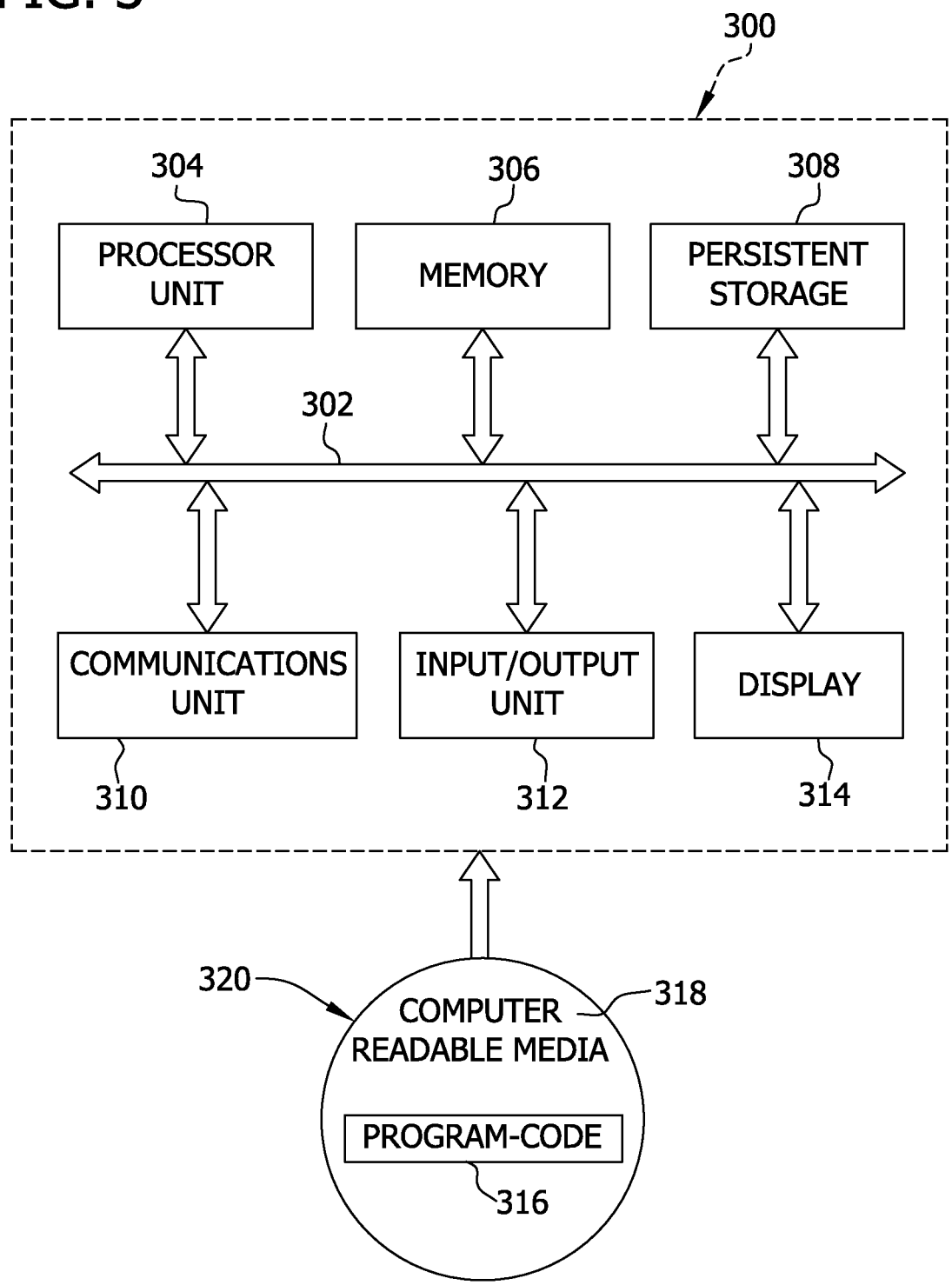
FIG. 3 is a diagram of a data processing system in accordance with an illustrative embodiment.

Turning now to FIG. 3, a diagram of a data processing system 300 is depicted in accordance with an illustrative embodiment. Specifically, data processing system 300 is one embodiment of a computer system upon which the SAV tool mentioned above can be run. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4A:
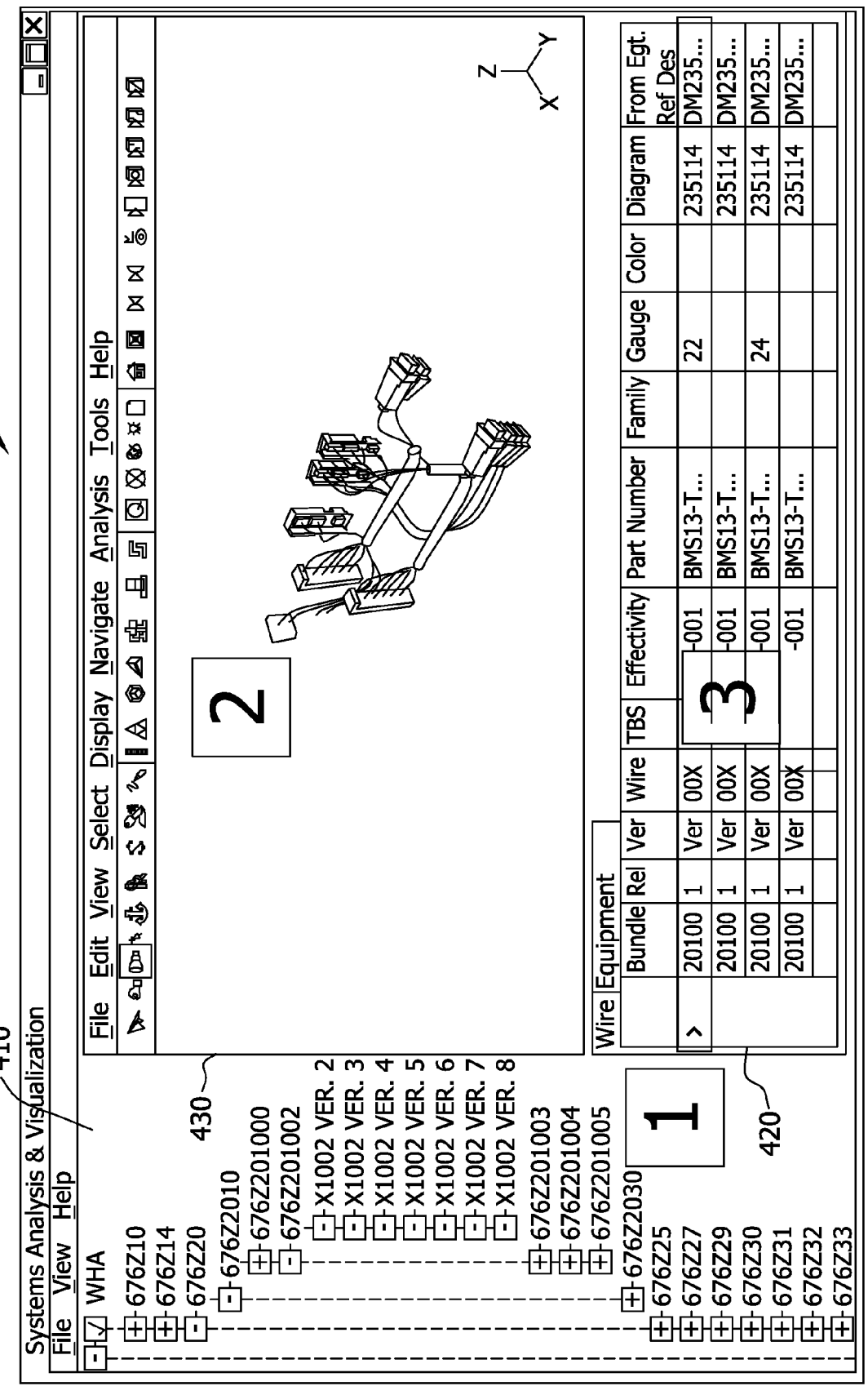
FIGS. 4A and 4B are illustrations of user interfaces associated with a systems analysis and visualization (SAV) tool.
Figure 4B:
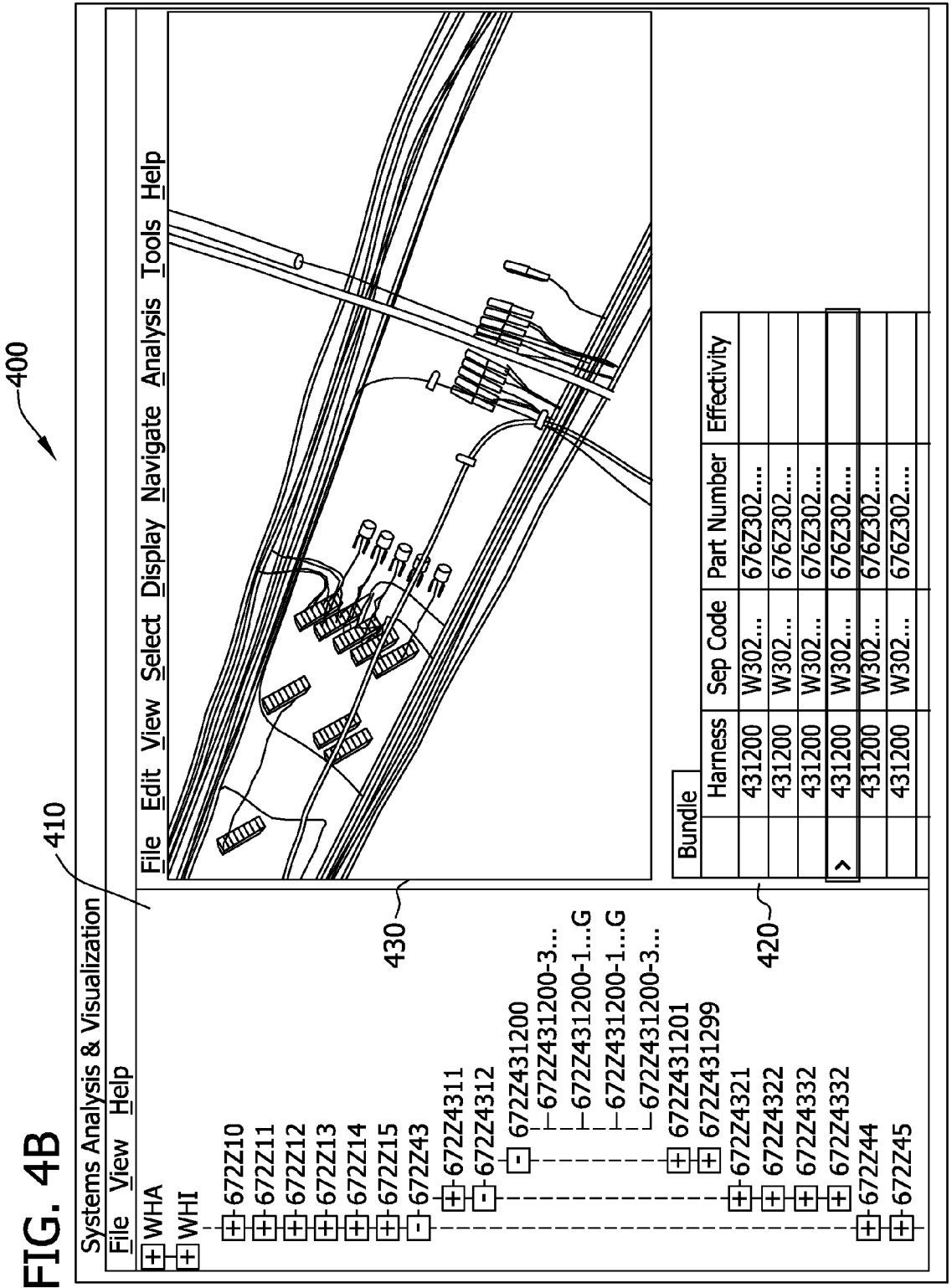

Existing wiring system analysis and verification solutions utilize either physical mockups or integrated solutions based on singular three dimensional design tools. However, if the various wiring systems are designed utilizing differing engineering toolsets, then the validation of the system must be done manually, generally on paper. FIGS. 4A and 4B are illustrations of user interfaces, 400 and 450 respectively, associated with a systems analysis and visualization (SAV) tool.

As further described herein, the SAV tool integrates wire bundle information 410, detail wire information 420, with a three dimensional visualization 430 of the design information that is generated from the wire bundle information 410 and the detail wire information 420. In other embodiments, two dimensional wiring diagrams and system schematics are utilized by the SAV tool to generate the three dimensional visualizations. Though not shown in FIGS. 4A and 4B, embodiments of the SAV tool also may include features such as coloration or "highlighting" of missing design information and spatial requirement violations. Routing and clearance provisions are also validated by the SAV tool.

In the illustrated embodiment, wire bundle information 410 is presented as a tree view of the wiring for the selected wiring bundle. The tree view provides an efficient method to navigate to available wire harness assemblies and installations for subsequent three dimensional visualization.

Detail wire information 420 is a detail view of the wiring bundle components and system connection characteristics. The wiring bundle component detail including wires, connections, and other bundle components for a selected bundle are provided. Detail wire information 420 also includes detailed information about the connective equipment interfaces.

As the name implies, three dimensional visualization 430 is presented as a three dimensional geometric view of the design space. Specifically, three dimensional visualization 430 is a display of the physical view of the requested wire harnesses and installations. Three dimensional visualization 430 also provides a two dimensional graphical view of associated logical information, including data such as schematics and diagrams graphical depicting the physical model.

Figure 5:
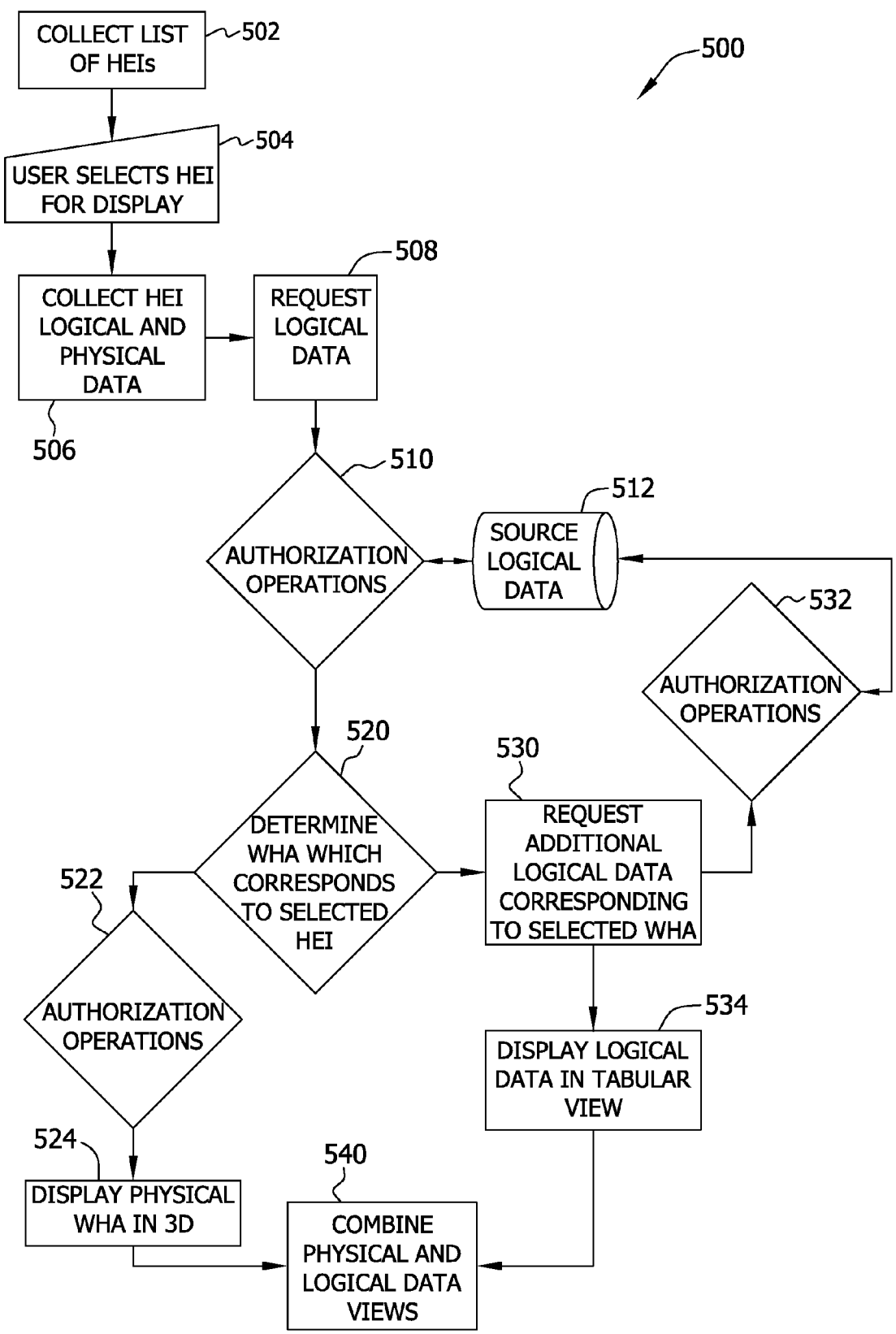
FIG. 5 is a flowchart that illustrates a process for combining both logical and physical data for analysis as performed by the SAV tool.

FIG. 5 is a flowchart 500 that illustrates a process for combining both logical and physical data for analysis as performed by the SAV tool. The illustrated example relates to the process which the SAV uses when displaying a Harness End Item (HEI), which is what is designed, against a Wire Harness Assembly (WHA), which is what is manufactured.

The process begins by collecting 502 and displaying a list of all HEIs as gathered from the logical data store. A user then selects 504, one of the HEIs, for display. The SAV tool then begins the process of collecting 506 physical and logical data for the selected 504 HEI which is initiated by requesting 508, via an authorization operation 510, logical data from a logical data storage area 512. These logical data stores hold information about HEIs and what configurations of airplanes, for example, to which these HEIs belong. Such configurations include individual wires, equipment, and other logical data about the HEI. In at least one embodiment, such linking is performed via part numbers and revisions of the HEI. Once authorization to access and view the data has been confirmed, the logical data is returned and displayed.

The next step is to determine 520 which Wire Harness Assembly (WHA) to display. As utilized herein, an HEI is a logical construct only. It has no actual physical presence. In contrast, the WHA is the three dimensional geometry that represents the HEI logical construct. In other words, the HEI represents what is designed and the WHA represents what is manufactured. Each approved and released HEI within the logical data store 512 has a WHA associated with it. After any authorization operations 522, this is the WHA that is selected for display 524. Again, once authorization to access and view the data has been confirmed, the physical data is returned and displayed 524, for example, as a three dimensional display.

Additional logical data about the particular WHA may also be requested 530. Once authorization 532 to access and view the additional WHA logical data has been confirmed, any additional logical data is returned from the logical data store 512. Some logical data is associated directly with the WHA and not the HEI. Therefore, any additional logical data corresponding to the selected WHA is requested 530. The data may come from the logical data store 512, or it may be associated and encapsulated within the 3D model itself as metadata. The data may contain items such as wire lengths and/or material types. Once all of this logical data is collected, it can be displayed 534 alongside the physical data display 524. In one embodiment, the physical WHA data and the additional logical data are combined 540 in a single display.

Figure 6A:
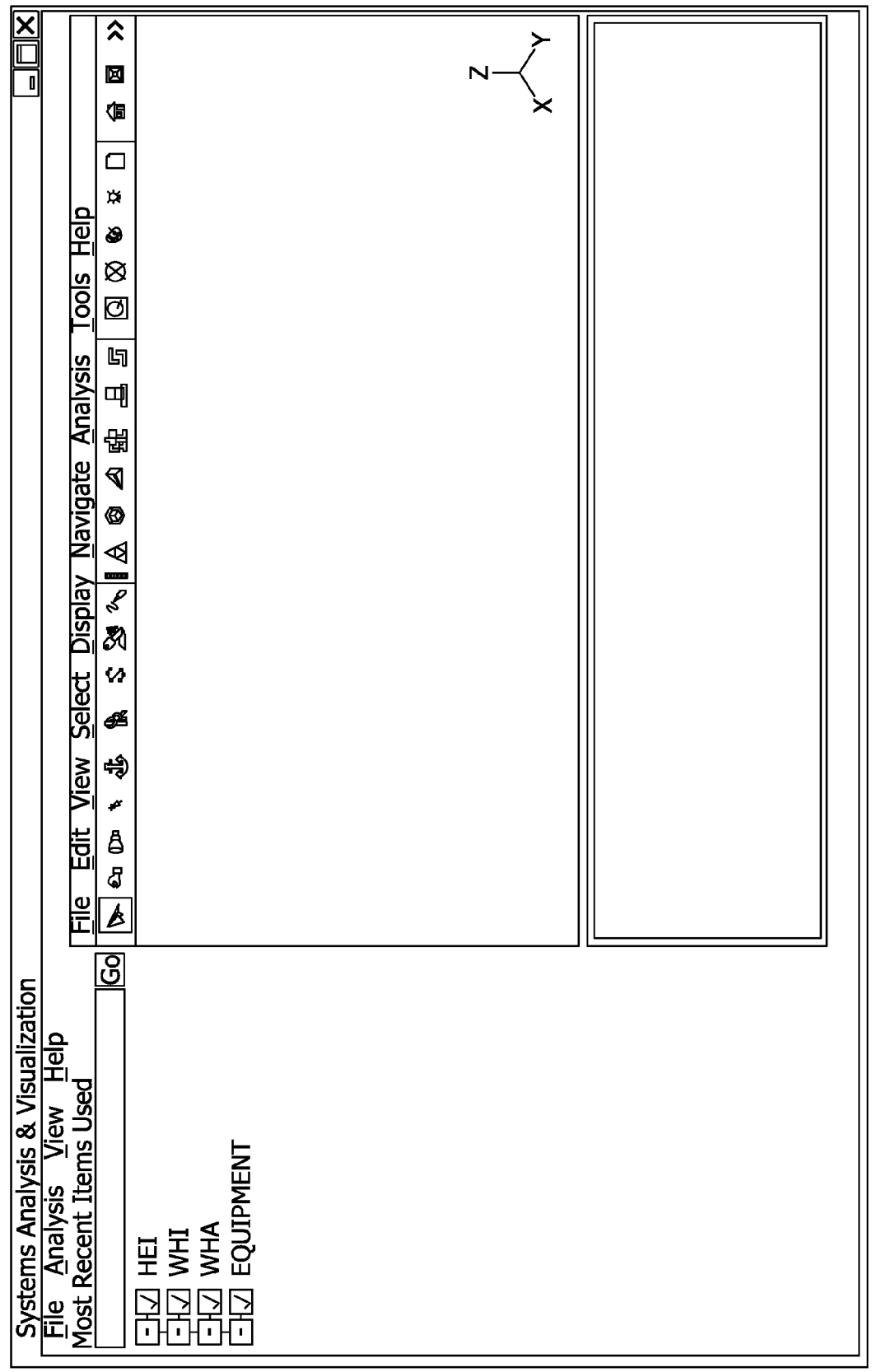
FIG. 6A is a computer screen associated with the SAV tool that is operable as a user interface for selection of harness end items (HEIs) and wire harness assemblies (WHAs).
Figure 6B:
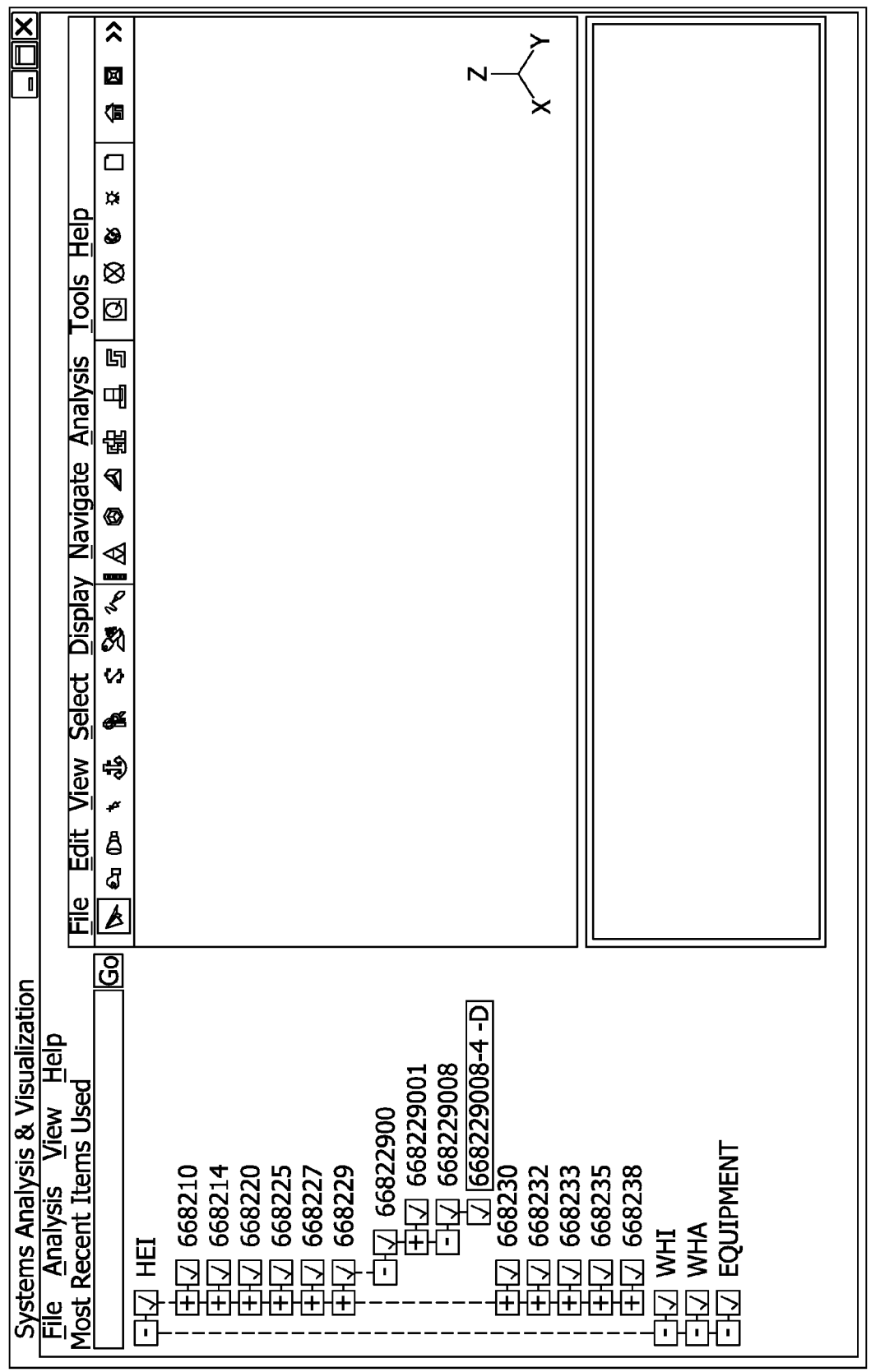
FIG. 6B is a computer screen that is displaying a menu of embedded HEIs.

FIG. 6A is a computer screen 600 that may be associated with the SAV tool. In screen 600, the user is able to select, for example, to choose from HEIs and/or WHAs. In FIG. 6B, referred to herein as computer screen 620, the user has selected to display a menu of HEIs, some of which are embedded within larger groups of HEIS, as is easily understood from the computer screen 620. As also shown by computer screen 620, the user has selected a specific HEI.

Figure 6D:
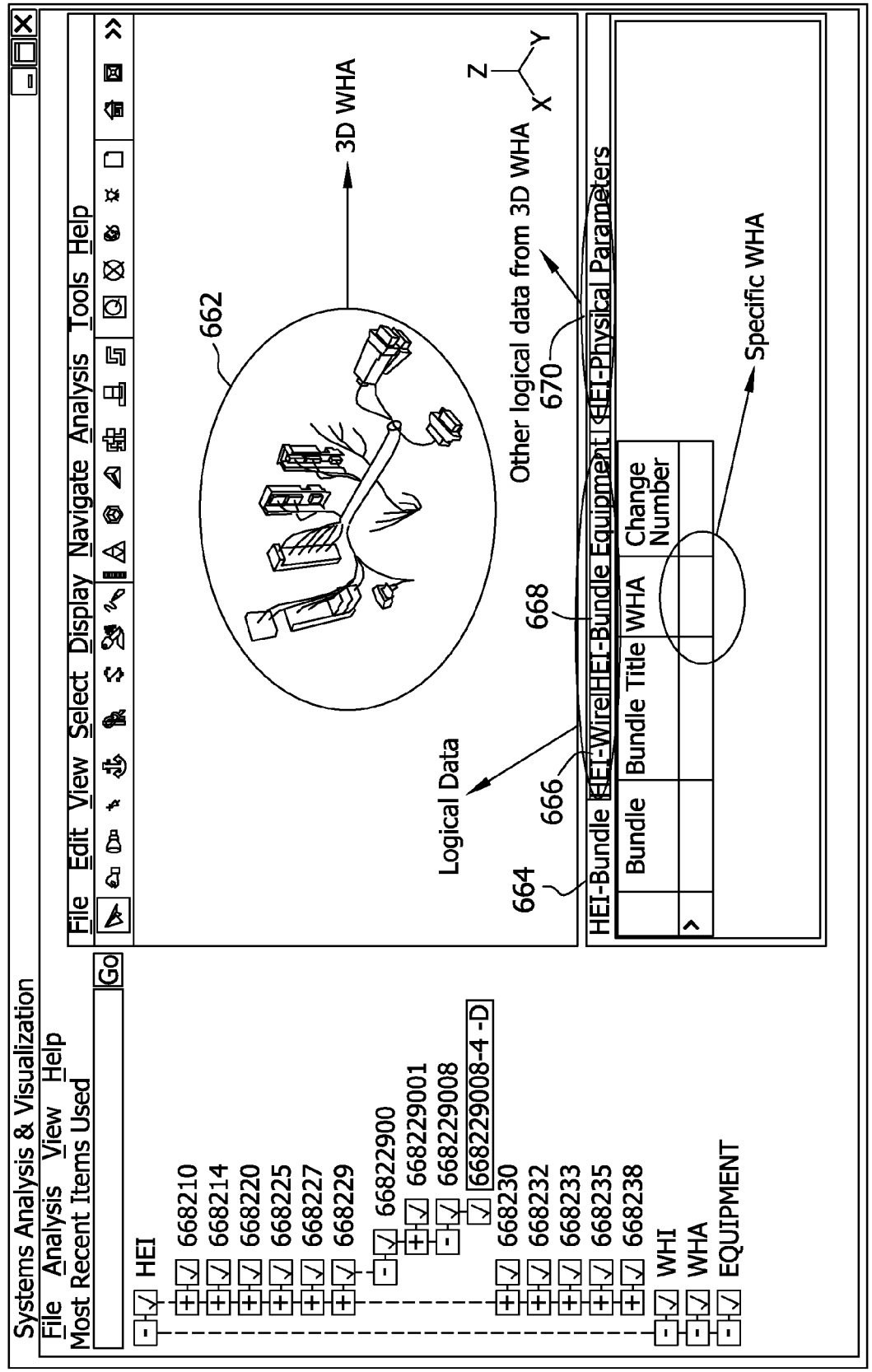
FIG. 6D is a computer screen that illustrates the gathered logical data for a selected HEI and associated WHA.

Now referring to FIG. 6C, referred to herein as computer screen 640, a sub-window 642 indicates that logical data for a selected HEI is being gathered. FIG. 6D is a computer screen 660 that illustrates the gathered logical data for the selected HEI. As mentioned above, each HEI is associated with a WHA. As such a three-dimensional WHA 662 is included within computer screen 660. User selectable tabs 664, 666, 668 are provided so that the user can select the various logical data associated with the HEI/WHA. Other logical data from the three-dimensional WHA can be displayed by the user through selection of user selectable tab 670.

Figure 7:
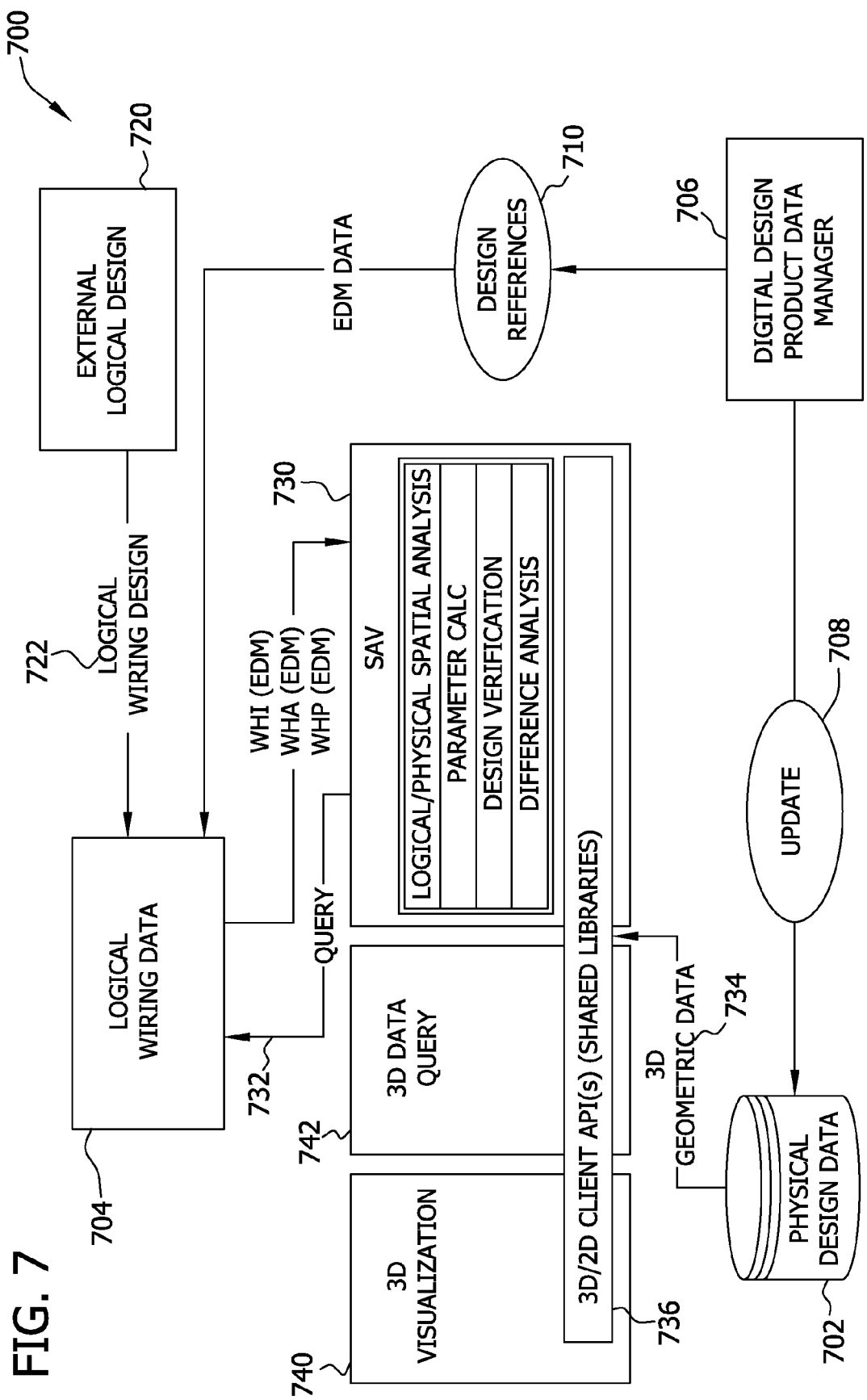
FIG. 7 is a functional diagram of a system architecture that includes the SAV tool.

FIG. 7 is a functional diagram of a system architecture 700 that includes the SAV tool. The SAV tool as mentioned above, combines logical, physical, three dimensional and two dimensional design documentation, manufacturing information, maintenance wiring information, and systems information. Now referring specifically to FIG. 7, the illustrated embodiment of system architecture 700 includes both a physical implementation data database 702 and a storage area for logical wiring data 704. A digital design product data manager 706 is utilized to provide updates 708 to the physical implementation data 702. The digital design product data manager 706 is further utilized to provide design references 710 to the logical wiring data 704. External logical design data 720, such as logical wire designs 722, are provided to the logical wiring data 704.

The logical wiring data 704 is operable to provide one or all of wire harness installation data, wire harness assembly data, and wire harness provision data to the SAV tool 730 in response to a query 732. The physical implementation data database 702 provides three dimensional geometric data 734 to application programming interfaces 736 which are utilized by the SAV tool 730. Three dimensional and two dimensional application programming interfaces (APIs) 736, including shared libraries, are utilized in conjunction with the SAV tool 730, in one embodiment, to provide three dimensional visualizations 740 and three dimensional data queries 742.

The SAV tool 730, as shown in FIG. 7, provides both logical and physical spatial analysis, parameter calculations, design verification, and difference analysis with respect to a specific design as received from one or both of the physical implementation data database 702 and the logical wiring data 704.

In one specific example, the three dimensional geometry for the design is translated out of CATIA. The extractions from that three dimensional geometry include inferences about the geometric types, make explicit design decisions, or extraction decisions based on physical characteristics that are cast within the design. These extractions, inferences and design decision pieces are brought together within the SAV tool to make sure that there is a one to one synchronization between the logical information and the physical information. The SAV tool includes routines that make validating and comparison within the SAV tool feasible for that particular implementation.

Figure 8:
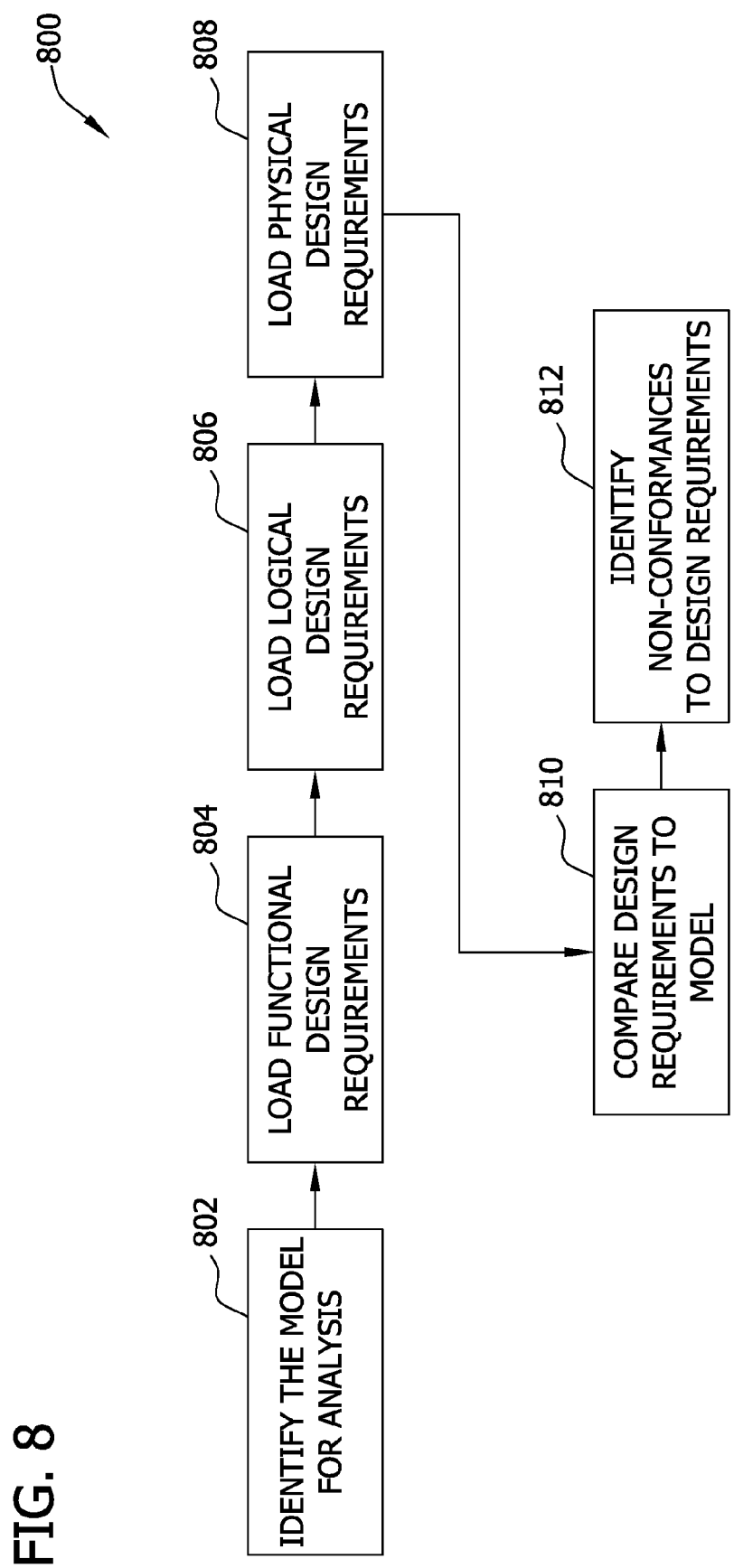
FIG. 8 is a flowchart that illustrates a process for verification of requirements utilizing the SAV tool.

FIG. 8 is a flowchart 800 that illustrates a process for requirements verification utilizing the above described SAV tool. Specifically, a wiring model is identified 802 for analysis, and functional design requirements are loaded 804. Logical design requirements are loaded 806 and physical design requirements are loaded 808. The design requirements (functional, logical, and physical) are compared 810 to the identified 802 model, for example, utilizing the information provided in FIGS. 4A, 4B, and/or 6D which are described above. Any non-conformances between the model and the design requirements are then identified 812, for example, as a visualization of identified non-conformances.

The above described embodiments, with regard to the integration of various design data, is applicable to designs other than wiring designs, and may be utilized to verify and validate, for example, structural compounds, mechanical components, component repair (validating the repair coincides with original requirements for the repair) to name but a few.

Existing wiring system analysis and verification solutions utilize either physical mockups or integrated solutions based on singular three dimensional design tools. However, if the various wiring systems are designed utilizing differing engineering toolsets, then the validation of the system must be done manually, generally on paper. The above described embodiments integrate the wiring system data from both a logical design system and a physical design system. This integration is an improvement over currently utilized methods because quality is significantly improved, costs are lowered, and man hours are saved. As described, the embodiments provide a three-dimensional visualization capability to wiring system logical data which up to this point did not exist.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for visually verifying a design of a wire system, said method comprising using a computer to:
retrieve logical design data associated with the wire system, and physical design data associated with the wire system;
extract data from a 3D computer model of the wire system;
convert the retrieved logical and physical design data and the extracted data into a common data format;
perform a difference analysis of the logical and physical design data with the extracted data from the 3D model to identify any non-conformances between the 3D model and the design data; and
graphically display any non-conformances.

2. The method according to claim 1 wherein the wire system includes a wire harness assembly.

3. The method according to claim 2 wherein the analysis includes tracing each individual wire in the wire harness assembly to ensure that wire harness routing is complete.

4. The method according to claim 1 wherein the 3D model indicates function, layout, and planned location of the wire system.

5. The method according to claim 1 wherein the logical data is accessed from wiring diagrams and schematics of the wire system.

6. The method according to claim 1 wherein performing the differences analysis and displaying the non-conformances are part of verification and validation of an aircraft wiring system design.

7. The method according to claim 1 further comprising graphically displaying information about the 3D model in a tree view.

8. The method according to claim 1 wherein the non-conformances include at least one of missing design information and spatial requirement violations.

9. The method of claim 1, wherein the 3D computer model is generated from a logical construct, and wherein at least some of the retrieved logical design data includes data that is not found in the logical construct.

10. The method of claim 1, wherein the logical design data includes a schematic of a wire system and the physical design data includes layout and location of wires in the wire system.

11. One or more computer-readable storage media having computer-executable instructions embodied thereon, wherein when executed by at least one processor, the computer-executable instructions cause the at least one processor to:
receive physical design data, and logical design data associated with a wire system;
extract data from a 3D computer model of the wire system;
convert the retrieved logical and physical design data and the extracted data into a common data format;
perform a difference analysis of the logical design data and the physical design data with the extracted data from the 3D computer model to identify any non-conformances between the design data and the 3D computer model; and
generate a visualization of the non-conformances on a user interface.

12. One or more computer-readable storage media according to claim 11 wherein the logical data is accessed from wiring diagrams and schematics of the wire system.

13. One or more computer-readable storage media according to claim 11 wherein the design data also includes functional design data; and wherein the functional design data is also compared to the data extracted from the 3D computer model.

14. One or more computer-readable storage media according to claim 11 wherein the non-conformances include at least one of missing design information and spatial requirement violations.

15. A computer system for verifying a design of a wire system, said computer system comprising a computer programmed to:
collect physical design data, and logical design data associated with the wire system;
extract data from a 3D computer model of the wire system;
convert the retrieved logical and physical design data and extracted data into a common data format;
perform a difference analysis of the logical and physical design data with the extracted data; and
graphically display any non-conformances between the design data and the data extracted from the 3D model.

16. The computer system according to claim 15 wherein the wire system includes a wire harness assembly.

17. The computer system according to claim 16 wherein the difference analysis includes tracing each individual wire in the wire harness assembly to ensure that wire harness routing is complete.

18. The computer system according to claim 17 wherein the logical data is accessed from wiring diagrams and schematics of the wire harness assembly.

19. The computer system according to claim 15 wherein the computer is further programmed to graphically display information about the wire system in a tree view.

20. The computer system according to claim 15 wherein the non-conformances include at least one of missing design information and spatial requirement violations.

* * * * *